Patented Nov. 14, 1933

1,935,497

UNITED STATES PATENT OFFICE 1,935,497

THERAPEUTICAL PREPARATION

Maxwell M. Becker, Kansas City, Mo., assignor to George A. Breon and Company, Incorporated, Kansas City, Mo., a corporation of Missouri No Drawing. Application July 25, 1932
Serial No. 624,659

4 Claims. (Cl. 167—68)

This invention relates to therapeutical preparations, and with regard to certain more specific features, to therapeutical fluids for parenteral injection in connection with the treatment known as non-specific protein therapy.

Among the several objects of the invention may be noted the provision of a therapeutical preparation of the class indicated which combines lacteal proteins, in concentrated form, with certain colloidally dispersed metals, thereby to secure new and advantageous results in non-specific protein therapy; the provision of a preparation of the class described which is aseptic; the provision of a preparation of the class described which is so constituted as to be effective in volumes considerably less than those heretofore injected, thereby tending greatly to reduce the pain of the subject due to distension of the tissues by bulky fluids and thereby also making it possible to utilize, for injection, muscles or tissues that would not otherwise be available; the provision of a preparation of the class described which contains the desirable milk proteins but which has had eliminated therefrom, or reduced in quantity therein, certain elements of the milk which cause systemic shock or malaise disproportionate to the therapeutic effect; and the provision of a method of manufacturing a preparation of the class described. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

Milk, usually from the cow, has heretofore been successfully injected parenterally in man and other animals for the purpose of stimulating resistance, on the part of the body, to infective diseases. This treatment is often referred to as "non-specific protein therapy". Manganese butyrate, a metallic colloid, has also been injected to obtain similar effects. It is the primary object of the present invention to combine and hold in stable solution the concentrated milk derivatives or lacteal proteins and metallic colloids of these general types, for the purpose of increasing the therapeutical efficiency of the treatment.

The invention is brought about in the following manner:

Lacteal proteins are first rendered soluble, preferably by the action of either a hydrate or a phosphate (sodium tri-basic phosphate being specifically preferred). The lacteal proteins used are generally those obtained from powdered, skimmed cow's milk, although other milks, such as goat's milk, or even human milk, are not to be considered as excluded. To the proteins thus made soluble, an agent is added which prevents the subsequent precipitation of the proteins in a solution either slightly acid or slightly alkaline, or neutral. Alkaline citrates, such as sodium citrate, are successful as such agents. The alkaline citrate has the additional advantage of holding in solution any phosphates left therein during the process of manufacture.

For example, a mixture is made according to the following proportions:

Powdered skimmed milk_____ 200 grams
Sodium tri-basic phosphate, C. P.___ 100 grams
Distilled water_____ 1200 cubic centimeters This mixture is heated, say in a "Pyrex" boiling flask, at a temperature of the order of 75° to 80° C., for about 100 minutes, the flask being occasionally shaken. The hot mixture is then filtered through rapidly-acting funnels and filter paper of relatively fine grain. The resulting filtrate has a gravity of about 9½° Baumé at 25° C. It is then evaporated in a porcelain evaporating dish on a water bath at a temperature of the order of 75° to 80° C., until concentrated to a gravity of about 15½° Baumé, read while hot. The film of coagulated material that forms is skimmed off. The concentrate, while hot, is then strained through gauze to free it of any lumps.

The concentrate is now placed in glass containers and seeded with crystals of a phosphate compound, to hasten crystallization of the phosphates present. When crystallization has been completed, the container is shaken vigorously a few times to induce the contents to flow.

The liquid concentrate is now separated from the phosphate crystals by vacuum filtration, preferably through very porous fiber paper and a funnel of the Buchner type. The filtrate is then refrigerated at the order of 6° C. for three days or more, at the end of which any accumulated sediment is removed.

The clear liquid prepared in the manner described contains approximately 0.08 grams of protein per cubic centimeter.

This concentrated protein solution is now combined with the metallic colloid, for example, manganese butyrate, in the following manner (the amounts being given as those required for one cubic centimeter of finished solution):

0.045 grams of sodium citrate is completely dissolved in 0.15 cubic centimeters of distilled water. To this solution is now added 0.5 cubic centimeters of the protein solution prepared in the foregoing manner. The solution is then acidulated with 0.012 cubic centimeters of butyric acid (C. P.) which is added in small portions and with thorough mixing after each addition. To the acidulated solution is then added in small quantities 0.3 cubic centimeters of a 5% solution of manganese butyrate, containing a small proportion of benzyl alcohol, and again with thorough mixing after each addition. Additional sodium citrate to the amount of 0.011 grams is now added. Finally, distilled water is added in sufficient quantity to bring the volume up to 1 cubic centimeter.

The finished solution thus prepared should have a pH value (hydrogen-ion concentration) of about 6.2 and should withstand sterilization. The final solution yields, upon analysis, approximately the following ingredients (per cubic centimeter):

| | |
|---|---|
| Protein | 0.04 grams |
| Manganese butyrate | 0.015 grams |
| Sodium citrate | 0.052 to 0.06 grams |
| Butyric acid | 0.012 cubic centimeters |
| Benzyl alcohol | 0.006 cubic centimeters |
| Distilled water, q. s. ad | 1.000 cubic centimeter |

The product, as has been indicated, is used by parenteral injection. The average adult dosage is about one cubic centimeter every one or two days in acute cases, and one cubic centimeter every two or three days in chronic cases. Injections may be made in the muscles of the arm, or in muscles elsewhere, or sub-cutaneously. On account of the small dosage, there is customarily no heightened temperature and little discomfort at the site of the injection.

While it is not necessary herein fully to go into the theory of the protective or therapeutic effect of the fluid here described, it may be indicated that its action is one of intensifying the body's own powers of resistance, in a non-specific manner. That is, by placing the proteins in the tissues by injection, a cellular reaction is caused, which acts upon the vascular system through the vasomotor nerves.

Persuasive evidence has heretofore been offered that the essential immunization is effected by elements mobilized in the blood serum. These are variously called enzymes, ferments, antibodies, opsonins, or bacteriolysins, but all are one in their antipathy to bacteria, which bacteria they appear to prepare for ingestion by the phagocytes of the blood. Following an injection of the fluid comprising the present invention there is nearly always a multiplication of phagocytes which are attracted in large numbers to the site of a tissue injury or local infection. The phagocytes apparently engulf the bacteria, after the bacteria have been acted upon by the body ferments, to digest the bacteria to their lowest degrees and hence to cause their elimination.

Injection of the fluid comprising the present invention has been found advantageous in the following, among other cases:

In gynecology, numerous inflammatory conditions, particularly such as pelvic infections of women, the injection is advantageous, and is followed by a stimulation particularly of the splanchnic organs.

In arthritis, injection is beneficial, usually, in chronic atrophic cases with much inflammation.

In peptic ulcers, the injection is beneficial, though probably not acting through the usual contra-bacterial manner, but rather by stimulation of vasomotor activity which reduces contractions of the stomach.

In opthalmology, particularly in the treatment of conditions such as iritis, corneal inflammations, sympathetic ophthalmia, and gonorrheal infections of the conjunctiva, injection is beneficial.

In peripheral vascular disorders, such as thromboangiitis obliterans, the injection is also beneficial.

In the treatment of dermatological conditions such as acne vulgaris and some types of eczema, injections between the layers of the skin, as well as intramuscular injections, have proved beneficial.

In the treatment of gonorrhea, injections are remarkably beneficial for the speed with which they sometimes eliminate the gonococci.

Advanced heart disease, extreme arteriosclerosis, and alcoholism are contra-indications to the use of the present invention. A history of hypersensitivity, such as serum sickness, asthma, or urticaria, should be followed only by cautious treatment. Diabetes (under control) and pregnancy are not contra-indications.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

I claim:

1. A therapeutical preparation for injection comprising a concentrated solution containing proteins of the therapeutical value corresponding to that of lacteal proteins, and manganese butyrate, both being present in conditions readily assimilable in the human body, and an alkaline agent and an acid agent adapted, respectively, to hold said proteins and said manganese butyrate in solution through their action to present a buffer solution having a pH value of about 6.2.

2. A therapeutical preparation for injection comprising the proteins of cow's milk and manganese butyrate in aqueous solution, and sodium citrate and butyric acid present in amounts sufficient to hold said proteins and manganese butyrate in solution.

3. A therapeutical preparation for injection comprising the proteins of cow's milk and manganese butyrate in aqueous solution, sodium citrate present in amounts sufficient to hold said proteins in solution, and butyric acid present in amount sufficient to give the solution a pH value of the order of 6.2.

4. A therapeutical preparation for injection having substantially the following composition:

| | |
|---|---|
| Lacteal proteins | 0.04 grams |
| Manganese butyrate | 0.015 grams |
| Sodium citrate | 0.052 to 0.06 grams |
| Butyric acid | 0.012 cubic centimeters |
| Benzyl alcohol | 0.006 cubic centimeters |
| Water, q. s. ad | 1.000 cubic centimeter |

MAXWELL M. BECKER.